US012399290B2

(12) United States Patent
Hu et al.

(10) Patent No.: US 12,399,290 B2
(45) Date of Patent: Aug. 26, 2025

(54) SEISMIC DATA ACQUISITION DEVICE AND SEISMIC DATA ACQUISITION METHOD

(71) Applicant: Institute of Geophysics, China Earthquake Admin., Beijing (CN)

(72) Inventors: Xingxing Hu, Beijing (CN); Yixiang Tang, Beijing (CN); Caihua Li, Beijing (CN); Xiaoyong Fang, Beijing (CN); Zhuolin Chen, Beijing (CN); Shi Chen, Beijing (CN)

(73) Assignee: Institute of Geophysics, China Earthquake Admin., Beijing (CN)

( * ) Notice: Subject to any disclaimer, the term of this patent is extended or adjusted under 35 U.S.C. 154(b) by 378 days.

(21) Appl. No.: 18/164,109

(22) Filed: Feb. 3, 2023

(65) Prior Publication Data

US 2024/0219594 A1 Jul. 4, 2024

(30) Foreign Application Priority Data

Dec. 31, 2022 (CN) .......................... 202211739394.3

(51) Int. Cl.
*G01V 1/16* (2006.01)
*G01V 1/36* (2006.01)

(52) U.S. Cl.
CPC .............. *G01V 1/164* (2013.01); *G01V 1/364* (2013.01); *G01V 2210/27* (2013.01)

(58) Field of Classification Search
CPC ..... G01V 1/164; G01V 1/364; G01V 2210/27
USPC .......................................................... 702/17
See application file for complete search history.

(56) References Cited

FOREIGN PATENT DOCUMENTS

| CN | 102324938 | * | 4/2008 | ............ H03M 1/367 |
| CN | 102324938 A | * | 1/2012 | ............ H03M 1/367 |
| CN | 103888140 | * | 3/2013 | |
| CN | 103888140 B | * | 4/2017 | |

* cited by examiner

*Primary Examiner* — Sujoy K Kundu
(74) *Attorney, Agent, or Firm* — CENTRAL CALIFORNIA IP GROUP, P.C.; Andrew D. Fortney

(57) ABSTRACT

A seismic data acquisition device and a seismic data acquisition method are disclosed. The seismic data acquisition device includes an anti-aliasing filter, a first conversion circuit, a second conversion circuit, and a controller. The anti-aliasing filter has an input configured to receive seismic data, which is generally an analog signal. The anti-aliasing filter has an output connected to an input of the first conversion circuit and an input of the second conversion circuit, respectively. The first conversion circuit has an output connected to a first input of the controller. The second conversion circuit has an output connected to a second input of the controller. The seismic data acquisition device and method enable wide dynamic seismic data acquisition with high resolution over the full amplitude range of the (seismic data) input signal.

13 Claims, 6 Drawing Sheets

SEISMIC DATA ACQUISITION DEVICE AND SEISMIC DATA ACQUISITION METHOD

TECHNICAL FIELD

The present disclosure relates to the technical field of seismic monitoring and, in particular, to a seismic data acquisition device and a seismic data acquisition method.

BACKGROUND

Seismic observation is the basis of seismic monitoring and seismic research, and the signal quality obtained by seismic observation directly affects the effectiveness of seismic monitoring and the level of seismic research. In obtaining seismic signals, data acquisition devices are responsible for performing conversion from analog signals output by sensors to digital signals. A dynamic range (DR) is an extremely important technical index to evaluate a seismic data acquisition device. Seismic observation signals have a wide dynamic range, including at least 8 orders of magnitude from minimum to maximum, a total dynamic range exceeding 160 dB.

With the development of electronic technology, the dynamic range of modern high-precision seismometers has reached more than 150 dB. However, unmatched with a high-precision seismometer with a large dynamic output, the maximum dynamic range of the current widely used 24-bit seismic data acquisition device is only 138 dB (when a sampling rate is 50 samples per second [SPS], the dynamic range is smaller in the presence of a higher sampling rate or a larger bandwidth), which is far from meeting the current demand of high-precision seismic monitoring.

SUMMARY

To overcome the problems in the related art, the present disclosure provides a seismic data acquisition device and a seismic data acquisition method.

According to a first aspect of an embodiment of the present disclosure, a seismic data acquisition device is disclosed, including an anti-aliasing filter, a first conversion circuit, a second conversion circuit, and a controller, wherein an input of the anti-aliasing filter is configured to receive analog seismic data (e.g., an analog signal), an output of the anti-aliasing filter is connected to an input of the first conversion circuit and an input of the second conversion circuit, an output of the first conversion circuit is connected to a first input of the controller, and an output of the second conversion circuit is connected to a second input of the controller.

The anti-aliasing filter is configured to filter the seismic data and then output an input signal.

The first conversion circuit is configured to convert the input signal to a first digital conversion signal when the input signal has a first voltage with an absolute value less than or equal to a voltage threshold, wherein the first digital conversion signal has a first resolution not less than a specified resolution.

The second conversion circuit is configured to convert the input signal to a second conversion digital signal based on voltage-frequency conversion and frequency counting when the input signal has a second voltage with an absolute value greater than the voltage threshold, wherein the second conversion signal has a second resolution not less than the specified resolution.

The controller is configured to fit the first conversion signal and the second conversion signal and output an acquisition result of the seismic data.

Optionally, the first conversion circuit includes a level matching resistor network, a first buffer, a pre-amplifier, a clock circuit, a fourth-order modulator, a second buffer, a digital filter, and a digital interface.

An input of the level matching resistor network is connected to the output of the anti-aliasing filter, an output of the level matching resistor network is connected to an input of the first buffer, and an output of the first buffer is connected to an input of the pre-amplifier.

A first input of the fourth-order modulator is connected to an output of the pre-amplifier. A second input of the fourth-order modulator is connected to the output of the second buffer, and an input of the second buffer is configured to receive a reference voltage. A third input of the fourth-order modulator is connected to the clock circuit. The clock circuit may also be connected to (e.g., provide a clock signal to) the first input of the digital filter and the first input of the digital interface. An output of the fourth-order modulator is connected to a second input of the digital filter.

An output of the digital filter is connected to a second input of the digital interface, and an output of the digital interface is connected to the first input of the controller.

Optionally, the second conversion circuit comprises a level shifter (e.g., a level shifting network), a voltage-frequency conversion circuit and a frequency counter, which may be connected in series or in sequence. An input of the level shifter is connected to the output of the anti-aliasing filter, and an output of the frequency counter is connected to the second input of the controller.

Optionally, the voltage-frequency conversion circuit has a dynamic range of 160 dB or above.

Optionally, the voltage-frequency conversion circuit comprises a signal input circuit, an adder, a compensation current circuit, a charge pump, a reference voltage source, an integrator, a voltage controlled oscillator, a third buffer, a frequency divider, and a charge pump clock.

An input of the signal input circuit is connected to an output of the level shifter, and an output of the signal input circuit is connected to a first input of the adder.

A second input of the adder is connected to the compensation current circuit, a third input of the adder is connected to an output of the charge pump, and an output of the adder is connected to an input of the integrator.

An input of the voltage controlled oscillator is connected to an output of the integrator, and an output of the voltage controlled oscillator is connected to an input of the third buffer.

An output of the third buffer is connected to inputs of the frequency counter and the frequency divider, respectively.

An input of the charge pump clock is connected to an output of the frequency divider, and an output of the charge pump clock is connected to a first input of the charge pump.

A second input of the charge pump is connected to the reference voltage source.

Optionally, the controller is further configured to calibrate the consistency of one or more specified parameters in the first conversion signal and the second conversion signal. The specified parameters may include at least one of an offset parameter, a linear parameter, and a scale factor.

Optionally, the controller fits the first conversion signal and the second conversion signal using the following equation:

$$Y(n) = \sum_{i=1}^{2} \delta_i Y_i(n), \text{ where } (\delta_1, \delta_2) = \begin{cases} (1, 0), & |x(t)| \leq U_0 \\ (0, 1), & |x(t)| > U_0 \end{cases}$$

where $U_0$ is the voltage threshold, $Y(n)$ is the acquisition result of the seismic data, $|x(t)|$ is the absolute value of the input signal at time t, $Y_1(n)$ is the first conversion signal, and $Y_2(n)$ is the second conversion signal.

Optionally, the specified resolution is 160 dB.

According to a second aspect of an embodiment of the present disclosure, a seismic data acquisition method is disclosed, comprising:

obtaining seismic data and filtering the seismic data to obtain an input signal;

converting the input signal to a first digital signal when the input signal has a voltage with an absolute value less than or equal to a voltage threshold, to obtain a first conversion signal having a resolution not less than a specified resolution;

converting the input signal to a second digital signal based on a voltage conversion frequency and a frequency counting mode when the input signal has the absolute value greater than the voltage threshold, to obtain a second conversion signal having the resolution not less than the specified resolution; and fitting the first conversion signal and the second conversion signal to obtain an acquisition result of the seismic data.

Optionally, fitting the first conversion signal and the second conversion signal to obtain the acquisition result of the seismic data comprises:

calibrating a consistency of one or more specified parameters of the first conversion signal and the second conversion signal to obtain a calibrated first conversion signal and a calibrated second conversion signal, wherein the one or more specified parameters may include at least one of an offset parameter, a linear parameter, and a scale factor;

fitting the calibrated first conversion signal and the calibrated second conversion signal into a 32-bit fitting result, and determining the fitting result as the acquisition result of the seismic data.

The technical solutions provided by embodiments of the present disclosure include at least the following beneficial effects. A seismic data acquisition device includes an anti-aliasing filter, a first conversion circuit, a second conversion circuit, and a controller. An input of the anti-aliasing filter is configured to receive seismic data which is an analog signal, an output of the anti-aliasing filter is connected to an input of the first conversion circuit and an input of the second conversion circuit, respectively, an output of the first conversion circuit is connected to a first input of the controller, and an output of the second conversion circuit is connected to a second input of the controller. The anti-aliasing filter is connected to filter the seismic data and then output an input signal. The first conversion circuit is configured to convert the input signal to a first digital conversion signal when the input signal has a first voltage with an absolute value less than or equal to a voltage threshold, wherein the first digital conversion signal has a first resolution not less than a specified resolution. The second conversion circuit is configured to convert the input signal to a second digital conversion signal based on voltage-frequency conversion and frequency counting when the input signal has a second voltage with an absolute value greater than the voltage threshold, wherein the second digital conversion signal has a second resolution not less than the specified resolution. The controller is configured to fit the first conversion signal and the second conversion signal and output an acquisition result of the seismic data. That is to say, when the seismic data acquisition device acquires an analog signal of seismic data, different conversion circuits may be used to perform analog-to-digital conversion and generate different signals (e.g., different digital signals for further processing). Specifically, an input signal in a relatively small range, in which an absolute value of the voltage is less than or equal to a voltage threshold, may be directly converted by a first conversion circuit to a digital signal, thereby ensuring that a high-precision digital signal can be obtained after the analog signal in the small range is converted. An analog input signal in a relatively large range, in which the absolute value of the voltage is greater than the voltage threshold, may be indirectly converted by a second conversion circuit to a digital signal based on voltage-to-frequency conversion and counting or determining the frequency (e.g., of the analog input signal), thereby ensuring that a high-precision digital signal can be obtained after the analog input signal in the relatively large range is converted. Finally, the digital signals obtained by the two-way conversion are fitted by the controller, and an acquisition result of the seismic data within a wide dynamic range can be obtained accurately, thereby breaking the technical limitation of shortage of a dynamic range of the existing analog-to-digital converter, achieving the application target of wide dynamic range acquisition, and improving the precision of seismic observation.

Additional features and advantages of the present disclosure will be set forth in the detailed description which follows.

BRIEF DESCRIPTION OF THE DRAWINGS

The drawings, which serve to provide a further understanding of the present disclosure and constitute a part of this specification, explain the present disclosure together with the detailed description which follows, and are not to be construed as limiting the present disclosure. In the drawings.

DETAILED DESCRIPTION

Figure 1:
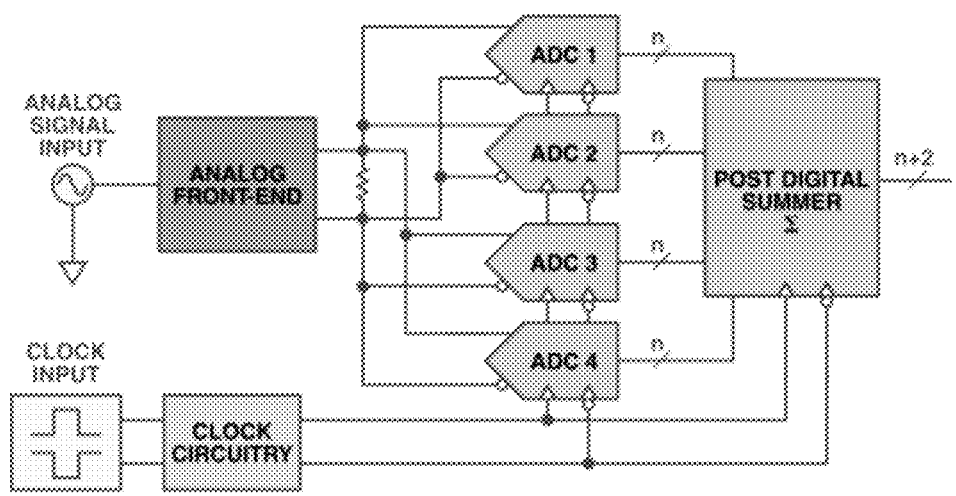
FIG. 1 shows a schematic structural diagram of a data acquisition device in the related art according to an exemplary embodiment.

Specific implementations of the present disclosure will be illustrated hereinafter in detail with reference to the drawings. It should be understood that the specific implementations described herein are illustrative and explanatory only and are not restrictive of the present disclosure.

In the description of the present disclosure, it should be noted that the terms "first", "second", "third", and the like are used for descriptive purposes only and are not to be construed as indicating or implying relative importance.

In the description of the present disclosure, it should also be noted that, unless expressly specified or limited otherwise, the terms "arranged", "mounted", "connected", and "connection" are to be interpreted broadly, e.g. as a fixed connection, as a detachable connection, or as an integral connection. The connection may be a mechanical connection or an electrical connection. The connection may be a direct connection or an indirect connection through an intermediate medium, and may be an internal communication between two elements. Those of ordinary skill in the art may understand specific implications of the above terms in the present disclosure in specific situations.

The technical solutions in this embodiment will be clearly and completely described below in combination with the drawings in this embodiment. Obviously, the described embodiments are only a few, but not all, embodiments of the present disclosure. Based on the embodiments in the present disclosure, all other embodiments obtained by those of ordinary skill in the art without making any inventive effort fall within the protection scope of the present disclosure.

The following is a description of specific terms used in the present disclosure:

Full scale range (FSR): maximum input voltage range of acquisition devices.

Dynamic range (DR): ratio of logarithmically represented maximum effective values of signal variation to minimum effective values, i.e. effective values of system self-noise.

Analog-to-digital converter (ADC): device for converting analog signals into digital signals.

With the development of electronic technology, the dynamic range of modern high-precision seismometers has reached more than 150 dB. However, unmatched with a high-precision seismometer with a large dynamic output, the maximum dynamic range of the currently widely used 24-bit seismic data acquisition device is only 138 dB, which is far from meeting the current requirements of high-precision seismic monitoring. When the signal is small, the resolution is not enough, the signal-to-noise ratio is poor or even the signal is completely submerged in the noise of an instrument. Waveform peak clipping distortion occurs when the signal is large and out of the input range of an acquisition device. Furthermore, the data acquisition device has a larger dynamic range than the seismometer in view of the fact that a certain signal-to-noise ratio is needed to effectively distinguish the signal when observing small weak signals in practice. Thus, a seismic data acquisition device with a wide dynamic range of 160 dB is an urgent need for high-precision seismic observation.

Currently, a low-speed and high-precision analog-to-digital converter is a 24-bit or 32-bit ADC based on a Delta-Sigma ($\Delta\Sigma$) modulation technology, which can achieve a dynamic range of more than 130 dB. In order to overcome the deficiency of the dynamic range of the ADC, a pre-amplification or attenuation circuit is often added to a pre-signal conditioning circuit in the development of the acquisition device, so as to adapt to different ranges of input signal by configuring different amplification or attenuation times (many ADCs have integrated a pre-amplifier with a programmable gain, i.e. a programmable gain amplifier (PGA)). Although the application scope of the acquisition device is improved by a pre-circuit, for example, the resolution of the acquisition device for small weak signals may be improved by setting a high gain, this "range" conversion cannot really expand the dynamic range of the acquisition device, while improving the resolution of small signals, but compressing the input range of large signals, i.e. reducing an upper limit of allowable observation. At present, the dynamic range of a high-performance seismic data acquisition device has been greatly improved, and the dynamic range may reach about 150 dB at the bandwidth of 20 Hz, but there are still many gaps from the full-range high-precision seismic observation.

Figure 2:
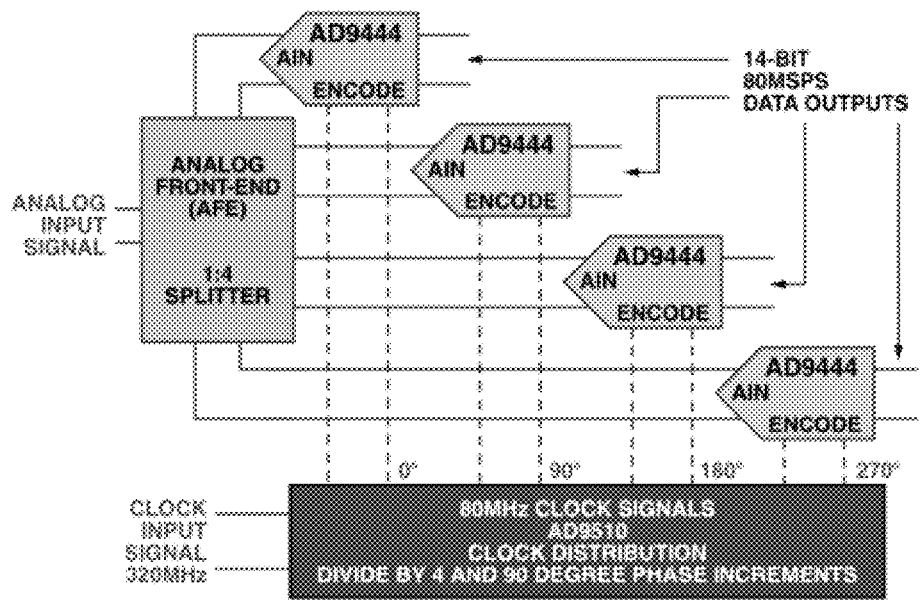
FIG. 2 shows a schematic structural diagram of a data acquisition device in the related art according to another exemplary embodiment.

In some related art, expansion of the dynamic range of an existing ADC is a common method for improving the dynamic range at present. One of the methods is to increase a signal-to-noise ratio SNR by using multiple ADC in parallel and averaging to reduce noise, as shown in FIG. 1. This method is to use N (such as 4) identical ADCs to perform synchronous AD conversion on the same input analog signal, and then digitally process and average conversion results of various channels to output a final conversion result. The calculation results show that the signal-to-noise ratio may be improved by 10×log(N) dB when the N ADCs are used in parallel for average acquisition. For example, the dynamic range of the acquisition device may be improved by 6 dB when four ADCs are used in parallel for average acquisition. Another method for expanding the dynamic range is to use multiple ADCs for interlaced sampling. As shown in FIG. 2, by using an N-channel ADC, the sampling rate of the acquisition device may be improved by N times while keeping the precision unchanged; or the sampling rate of a single-channel ADC may be reduced to 1/N of the sampling rate required by the acquisition device at the same sampling rate, thereby reducing noise. When N ADCs are used for interlaced sampling, the dynamic range of the acquisition device may be improved by 10×log(N) dB.

However, when using the N-channel ADC, the dynamic range may be improved by 10×log(N) (dB), i.e. the amount of improvement in the dynamic range is related to the number of ADC channels used. In application, the number of ADC channels used is generally not more than 4, and the dynamic range may be improved by about 6 dB at this moment. It can be seen that the improvement effect of this method is limited and the problems of complex circuitry, high cost, increased power consumption and increased PCB board area will result.

In some related art, a method for expanding a dynamic range of a seismic data acquisition device by using a multi-channel ADC to hierarchically acquire input signals according to the magnitude is proposed, for example, a method and system for hierarchically acquiring seismic signals with a high dynamic range as disclosed in CN Patent No. 201410056743.0. Input signals are hierarchically acquired according to the magnitude, the input signals within the range of each stage are acquired by an AD channel configured with a corresponding acquisition range, and the outputs of each channel are fused to a large dynamic output of 32 bits through the processing by an acquisition control unit.

However, the multi-channel ADC hierarchical acquisition mode may achieve large dynamic expansion with a smaller number of stages (such as a two-channel ADC). However, this mode has disadvantages in that the resolutions of the stages are different, and the resolution of the stage of a signal having a small voltage amplitude (hereinafter referred to as a small signal) is high and the resolution of the stage of a signal having a large voltage amplitude (hereinafter referred to as a large signal) is low, thereby limiting the application.

In conclusion, a seismic data acquisition device with a wide dynamic range of 160 dB is required in high-precision seismic observation. However, limited by an electronic technology level, the dynamic range achievable by the current high-precision 24-bit or 32-bit ADC does not exceed 138 dB (a sampling rate of 50 SPS or a bandwidth of 20 Hz). In the dynamic range expansion technology using the existing ADC, some of the improvement effects on the dynamic range (increasing the amount of dB) are proportional to the logarithm of the number N of ADC channels used, the effect is limited, and the circuit is complex. In some cases, the resolutions of large and small input signals are inconsistent after the dynamic range expansion.

In view of the above problems, this embodiment provides a seismic data acquisition device and a seismic data acquisition method, which can realize wide dynamic seismic data acquisition of 160 dB having the same resolution within the full range of input signals, thereby not only reducing the noise of the acquisition device and improving the resolution of seismic signals, but also expanding the range of maximum input signals of the acquisition device and enhancing the monitoring capability of large seismic signals. Furthermore, the precision of seismic observation can be effectively improved, thus enhancing the seismic monitoring capability.

Figure 3:
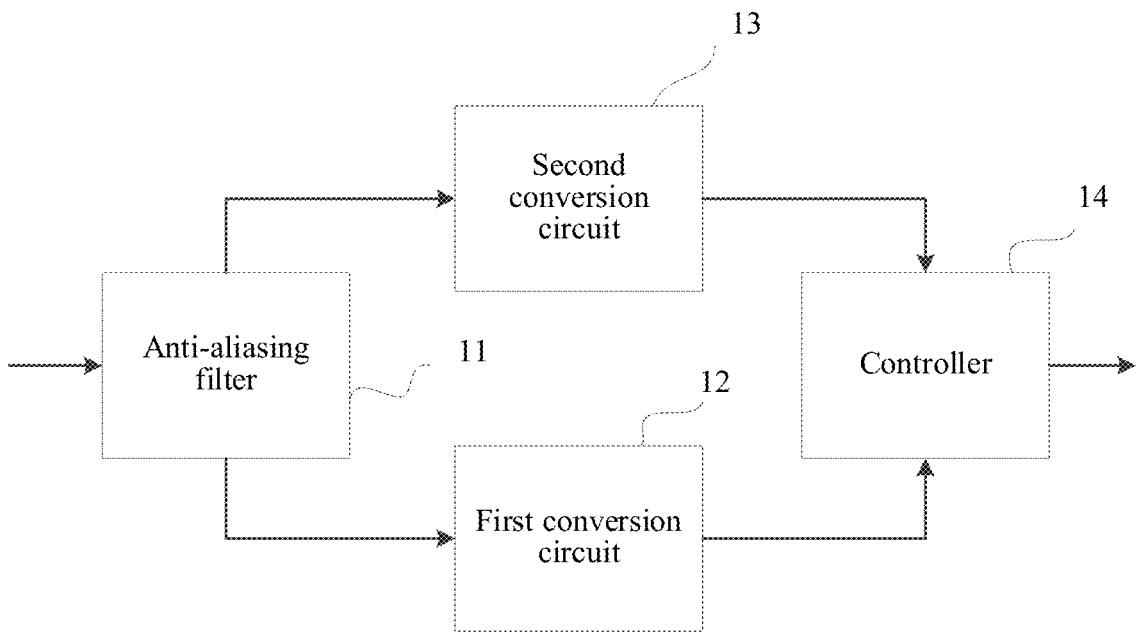
FIG. 3 shows a schematic structural diagram of a seismic data acquisition device according to an exemplary embodiment.

FIG. 3 shows a schematic structural diagram of a seismic data acquisition device according to an exemplary embodiment. As shown in FIG. 3, the seismic data acquisition device 10 may comprise an anti-aliasing filter 11, a first conversion circuit 12, a second conversion circuit 13, and a controller 14, wherein an input of the anti-aliasing filter 11 is configured to receive seismic data which is an analog signal, an output of the anti-aliasing filter 11 is connected to an input of the first conversion circuit 12 and an input of the second conversion circuit 13, an output of the first conversion circuit 12 is connected to a first input of the controller 14, and an output of the second conversion circuit 13 being connected to a second input of the controller 14.

The anti-aliasing filter 11 is configured to filter the seismic data and then output an input signal.

The first conversion circuit 12 is configured to convert the analog input signal to a first digital conversion signal when it has a voltage with an absolute value less than or equal to a voltage threshold. The first digital conversion signal may have a resolution not less than a specified resolution.

The second conversion circuit 13 is configured to convert the analog input signal to a second digital conversion signal based on voltage-frequency conversion and frequency counting when the input signal has a voltage with an absolute value greater than the voltage threshold. The second digital conversion signal may also have a resolution not less than the specified resolution.

The controller 14 is configured to fit the first conversion signal and the second conversion signal and output an acquisition result of the seismic data.

In practical application, the seismic data acquisition device 10 may be connected to a high-precision seismometer, and after the high-precision seismometer measures seismic data, the anti-aliasing filter 11 in the seismic data acquisition device 10 may receive the seismic data. The seismic data is generally an analog signal, and therefore the seismic data acquisition device 10 subsequently needs to convert the seismic data into a digital signal for output and further processing (e.g., by the controller). The anti-aliasing filter is configured to attenuate the noise in the seismic data (e.g., to be low enough to avoid inadvertent detection and/or conversion by the conversion circuits 12 and 13), and an input signal may be obtained after the seismic data is filtered by the anti-aliasing filter.

Thereafter, the input signal may be subjected to analog-to-digital conversion by the first conversion circuit 12 and the second conversion circuit 13, respectively, in the seismic data acquisition device 10. The first conversion circuit 12 is configured to convert a relatively small analog signal into the digital input signal. The small signal is a signal having a voltage with an absolute value less than or equal to a voltage threshold, for example, a signal having a voltage between −100 mV and +100 mV. The second conversion circuit 13 is configured to convert a relatively large analog signal into the digital input signal. The relatively large signal is a signal having a voltage with an absolute value greater than the voltage threshold, for example, a signal having a voltage less than −100 mV and greater than −20 V, or greater than +100 mV and less than +20 V.

Optionally, the first conversion circuit 12 may comprise a circuit for converting the input signal using direct analog-to-digital conversion, for example using an existing ADC, so as to obtain the first conversion signal. The second conversion circuit 13 may comprise a circuit for converting the input signal using indirect analog-to-digital conversion based on a voltage-to-frequency conversion. Since the dynamic range that can be achieved by a high-precision 24-bit or 32-bit ADC at present does not exceed 138 dB, it cannot ensure that a signal with a relatively large voltage amplitude has a higher resolution (e.g., exceeding 138 dB) after conversion. Therefore, the circuit for converting the input signal using indirect analog-to-digital conversion based on voltage-to-frequency conversion may ensure that the second conversion signal obtained indirectly has a resolution similar or identical to that of the analog signal having a voltage with a relatively small absolute value.

Finally, the controller 14 may fit the first conversion signal and the second conversion signal using a preset equation, so as to obtain a final acquisition result of the seismic data.

It can be seen that in this embodiment, the seismic data acquisition device 10 comprises an anti-aliasing filter 11, a first conversion circuit 12, a second conversion circuit 13, and a controller 14. An input of the anti-aliasing filter 11 is configured to receive seismic data which is an analog signal, an output of the anti-aliasing filter 11 is connected to an input of the first conversion circuit 12 and an input of the second conversion circuit 13, respectively, an output of the first conversion circuit 12 is connected to a first input of the controller 14, and an output of the second conversion circuit 13 is connected to a second input of the controller 14. The anti-aliasing filter 11 is connected to filter the seismic data and then output an input signal. The first conversion circuit 12 is configured to convert the input signal to a first digital conversion signal when the input signal has a voltage with an absolute value less than or equal to a voltage threshold. The first digital conversion signal has a resolution not less than a specified resolution. The second conversion circuit 13 is configured to convert the input signal based on voltage-frequency conversion and frequency counting when the voltage of the input signal has an absolute voltage value greater than the voltage threshold, to obtain a second digital conversion signal having at least the specified resolution. The controller 14 is configured to fit the first conversion signal and the second conversion signal and output an acquisition result of the seismic data. When the seismic data acquisition device 10 acquires an analog signal of seismic data, different conversion circuits may perform analog-todigital conversion on the analog signal in different voltage amplitude ranges. Specifically, an analog signal in a smaller range, in which an absolute value of the voltage is less than or equal to a voltage threshold, may be converted directly by the first conversion circuit 12, thereby ensuring that a high-precision digital signal can be obtained after the signal with a smaller range is converted. The analog signal in a larger range, in which an absolute value of the voltage is greater than the voltage threshold, may be indirectly converted by the second conversion circuit 13 based on a voltage-frequency conversion and frequency counting, thereby ensuring that a high-precision digital signal can be obtained after the signal with a larger absolute value is converted. Finally, the digital signals obtained by the two types of analog-to-digital conversion are fitted by the controller 14, and an acquisition result of the seismic data within a wide dynamic range can be obtained accurately, thereby breaking the technical limitation of shortage of a dynamic range of the existing analog-to-digital converter.

Figure 4:
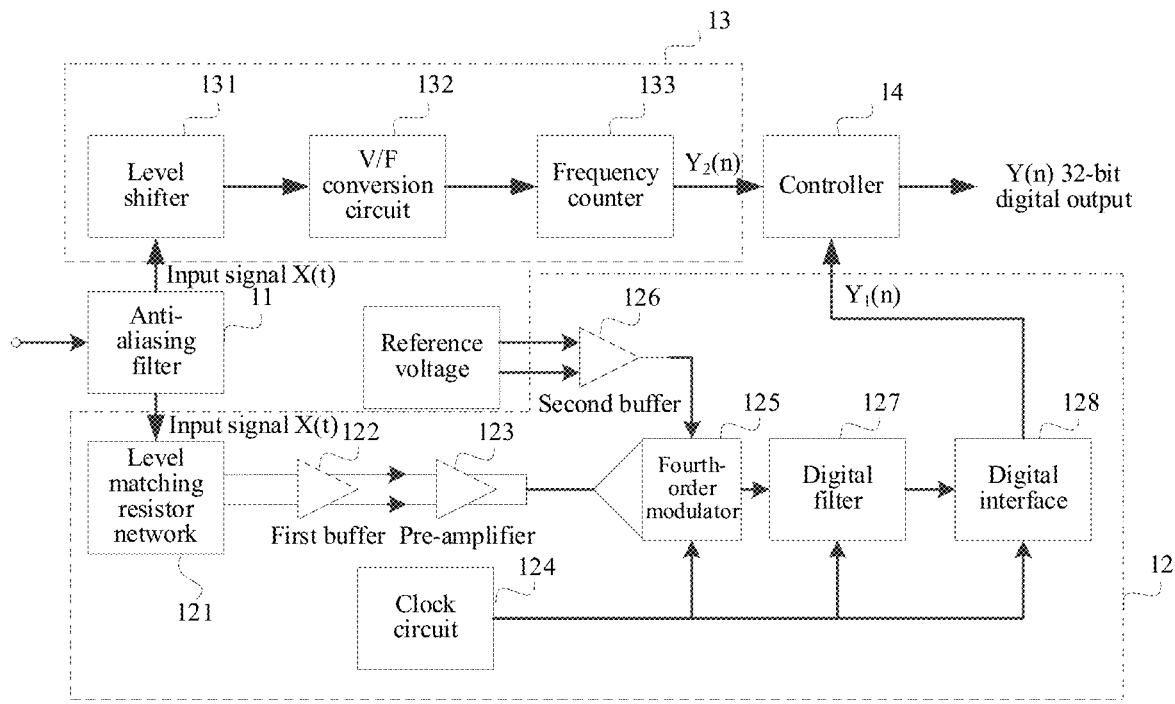
FIG. 4 shows a schematic structural diagram of a seismic data acquisition device according in to another exemplary embodiment.

In some implementations, as shown in FIG. 4, the first conversion circuit 12 comprises a level matching resistor network 121, a first buffer 122, a pre-amplifier 123, a clock circuit 124, a fourth-order modulator 125, a second buffer 126, a digital filter 127, and a digital interface 128.

An input of the level matching resistor network 121 is connected to the output of the anti-aliasing filter 11, an output of the level matching resistor network 121 is connected to an input of the first buffer 122, and an output of the first buffer 122 is connected to an input of the pre-amplifier 123.

A first input of the fourth-order modulator 125 is connected to an output of the pre-amplifier 123. The fourth-order modulator 125 is also connected to the clock circuit 124 and an output of the second buffer 126, respectively. For example, a second input of the fourth-order modulator 125 is connected to the output of the second buffer 126, and an input of the second buffer 126 is configured to receive a reference voltage signal. A third input of the fourth-order modulator 125 is connected to the clock circuit 124. The clock circuit 124 is also connected to a first input of the digital filter 127 and a first input of the digital interface 128. An output of the fourth-order modulator 125 is connected to a second input of the digital filter 127. Optionally, the fourth-order modulator 125 may be a fourth-order delta-sigma (42) modulator.

An output of the digital filter 127 is connected to a second input of the digital interface 128, and an output of the digital interface 128 is connected to the first input of the controller 14.

Illustratively, in practical application, an input signal X(t) output by the anti-aliasing filter 11 passes through the level matching resistor network 121 (i.e. a resistor network providing a level matching function) in the first conversion circuit 12 on the one hand, is buffered and/or subjected to input isolation by the input first buffer 122, and then is amplified by the pre-amplifier 123. The amplified signal is converted into a 1-bit-wide data stream with a high sampling frequency (such as 512 kHz) by the fourth-order delta-sigma (ΔΣ) modulator, and the modulated signal (i.e., the 1-bit data stream) then is filtered by the digital filter 127 to obtain a lower sampling rate (below 1000 Hz, which may be beneficial for the seismic signal), and a low-noise and high-precision digital signal $Y_1(n)$ is output as the first conversion signal. Optionally, the digital filter 127 may be a programmable digital decimation filter.

Optionally, the first conversion circuit 12 may comprise a 24-bit or 32-bit low-noise and high-precision analog-to-digital conversion chip, integrated with a high-order delta-sigma (ΔΣ) modulator. For example, an ADC chip such as ADS1255 and ADS1283 may be integrated with an input buffer, a programmable pre-amplifier, a delta-sigma modulator, and a programmable digital decimation filter, etc., thereby simplifying the system circuit.

Figure 5:
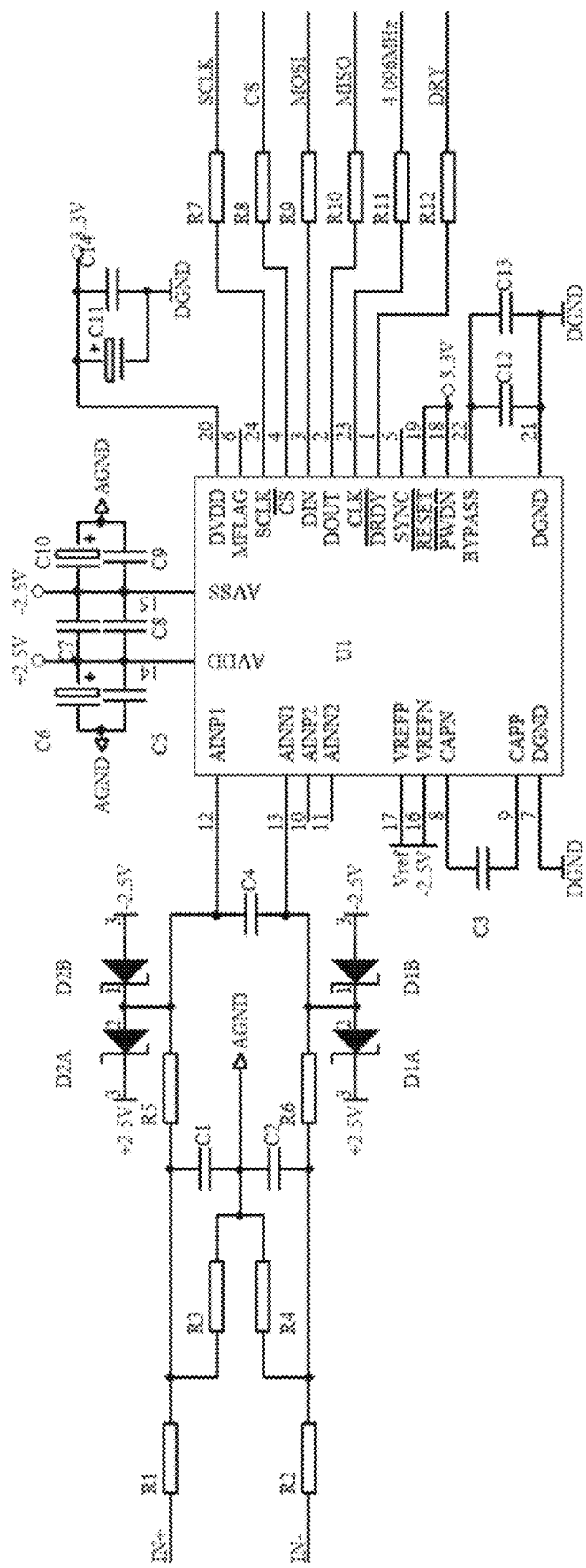
FIG. 5 shows a schematic circuit diagram of a first conversion circuit according to an exemplary embodiment.

As an example, as shown in FIG. 5, the first conversion circuit 12 may comprise an analog-to-digital conversion chip ADS1283B (U1). With reference to the circuit of FIG. 5, an analog input signal (e.g., a differential analog signal, on nodes IN+ and IN−) is input on two pins: AINP1 and AINN1. Power supplies (the AVDD and AVSS pins) for analog circuitry are respectively connected to low-noise power supplies of +2.5 V and −2.5 V. DVDD (power supply for digital circuitry) is connected to a power supply of 3.3 V. A positive reference voltage source input VREFP is connected to a high-precision, low-noise and low-temperature drift reference voltage source of 2.5 V, and a negative reference voltage source input VREFN is connected to an analog power supply of −2.5 V. Resistors R1-R6 and capacitors C1-C3 constitute the input and anti-aliasing filter 11. Input protection diodes D1 and D2 function to clamp and/or protect the input level of the analog input signal. The input protection diode D1 includes two parts: diode D1A and diode D1B in FIG. 5. The input protection diode D2 includes two parts: diode D2A and diode D2B in FIG. 5. SCLK, DIN and DOUT pins are connected to SCLK, MOSI and MISO signals of an SPI interface of the acquisition controller 14. A $\overline{CS}$ pin is connected to the acquisition controller 14 as an I/O port of an SPI chip selection signal. A $\overline{DRDY}$ pin is used for an interrupt input signal of the acquisition controller 14. A CLK pin is connected to an external clock signal having a frequency of 4.096 MHz. Ground pins AGND and DGND for analog and digital circuitry are connected at one point (e.g., a ground plane) in the circuit board on which the analog-to-digital conversion chip is mounted. A configuration register (e.g., CONFIG. 1) of the ADS1283B chip is configured to program at least part of the chip. For example, the lowest or least significant three bits (e.g., bits [2:0]) may be used to program the pre-amplifier (e.g., PGA[2:0]=110).

In some implementations, referring to FIG. 4 again, the second conversion circuit 13 comprises a level shifter (e.g., a level shifting network) 131, a V/F conversion circuit 132 and a frequency counter 133, connected in series or in sequence. An input of the level shifter 131 is connected to the output of the anti-aliasing filter 11, and an output of the frequency counter 133 is connected to the second input of the controller 14. The V/F conversion circuit 132 comprises a voltage-frequency conversion circuit.

In practical application, after the voltage level of the input signal X(t) output by the anti-aliasing filter 11 is adjusted by the level shifter 131, an analog input signal is converted into a frequency (e.g., alternating) signal by the V/F conversion circuit 132. The V/F conversion circuit 132 may have a large dynamic range. The V/F conversion circuit 132 may convert an input analog voltage signal into a signal having a frequency of 1 Hz to 100 MHz. The frequency of the signal output from the V/F conversion circuit 132 is counted or determined by the frequency counter 133 to obtain a digital signal $Y_2(n)$ as the second conversion signal.

Optionally, the V/F conversion circuit 132 has a dynamic range of 160 dB or above.

Optionally, the voltage-to-frequency (V/F) conversion circuit may have a good linearity and/or a small temperature drift, in addition to a dynamic range of more than 160 dB, such as a V/F conversion circuit 132 having an output frequency of 1 Hz to 100 MHz.

Figure 6:
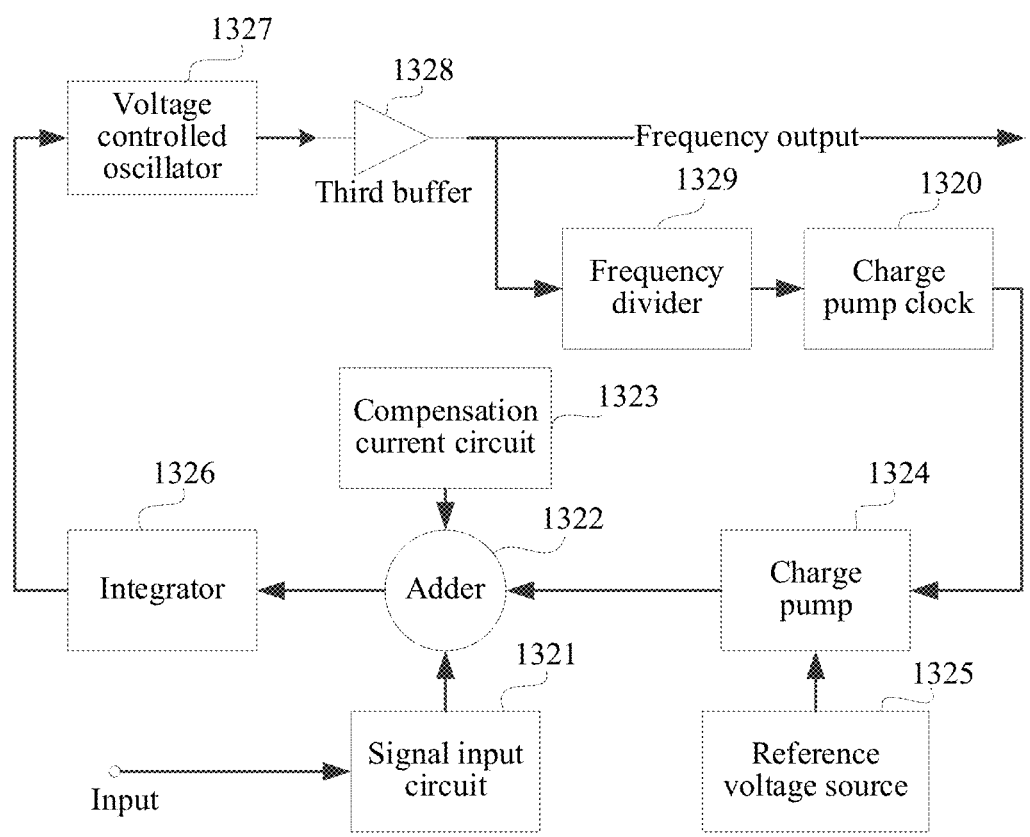
FIG. 6 shows a schematic structural diagram of a voltage-frequency (V/F) conversion circuit according to an exemplary embodiment.

As an example, as shown in FIG. 6, the V/F conversion circuit 132 may comprise a signal input circuit 1321, an adder 1322, a compensation current circuit 1323, a charge pump 1324, a reference voltage source 1325, an integrator 1326, a voltage controlled oscillator 1327, a third buffer 1328, a frequency divider 1329, and a charge pump clock 1320.

An input of the signal input circuit 1321 is connected to an output of the level shifter 131, and an output of the signal input circuit 1321 is connected to a first input of the adder 1322.

A second input of the adder 1322 is connected to the compensation current circuit 1323, a third input of the adder 1322 is connected to an output of the charge pump 1324, and an output of the adder 1322 is connected to an input of the integrator 1326.

An input of the voltage controlled oscillator 1327 is connected to an output of the integrator 1326, and an output of the voltage controlled oscillator 1327 is connected to an input of the third buffer 1328.

An output of the third buffer 1328 is connected to inputs of the frequency counter 133 and the frequency divider 1329, respectively.

An input of the charge pump clock 1320 is connected to an output of the frequency divider 1329, and an output of the charge pump clock 1320 is connected to a first input of the charge pump 1324.

A second input of the charge pump 1324 is connected to the reference voltage source 1325.

In practical applications, the signal input circuit 1321 processes the output signal of the level shifter 131 into an input signal that meets the requirements of the V/F conversion circuit 132. The compensation current circuit 1323 is configured to provide a compensation current to the adder 1322, and the charge pump 1324 is configured to provide a charge pump current to the adder 1322 from a reference voltage provided by a reference voltage source 1325 and a clock signal from the charge pump clock 1320. The input signal, the charge pump current, and the compensation current are combined by the adder 1322 and input to the integrator 1326, where they are converted to voltage outputs. The integrator 1326 outputs a voltage as an input control voltage to the linear voltage controlled oscillator 1327, and the voltage controlled oscillator 1327 outputs a frequency signal proportional to the magnitude of the input control voltage. The frequency signal is buffered by the third buffer 1328, and the buffered frequency signal is an output of the present-stage V/F conversion circuit 132. Meanwhile, the output frequency signal also functions as an input signal to the charge pump clock 1320, after its frequency is divided by the frequency divider 1329. Alternatively, the frequency-divided output frequency signal can be used directly as a clock signal for the charge pump 1324. Under the action of the charge pump clock 1320, the charge pump 1324 converts a stable voltage output by the low-noise and high-precision reference voltage source 1325 into a current output proportional to the magnitude of the input clock frequency.

Figure 7:
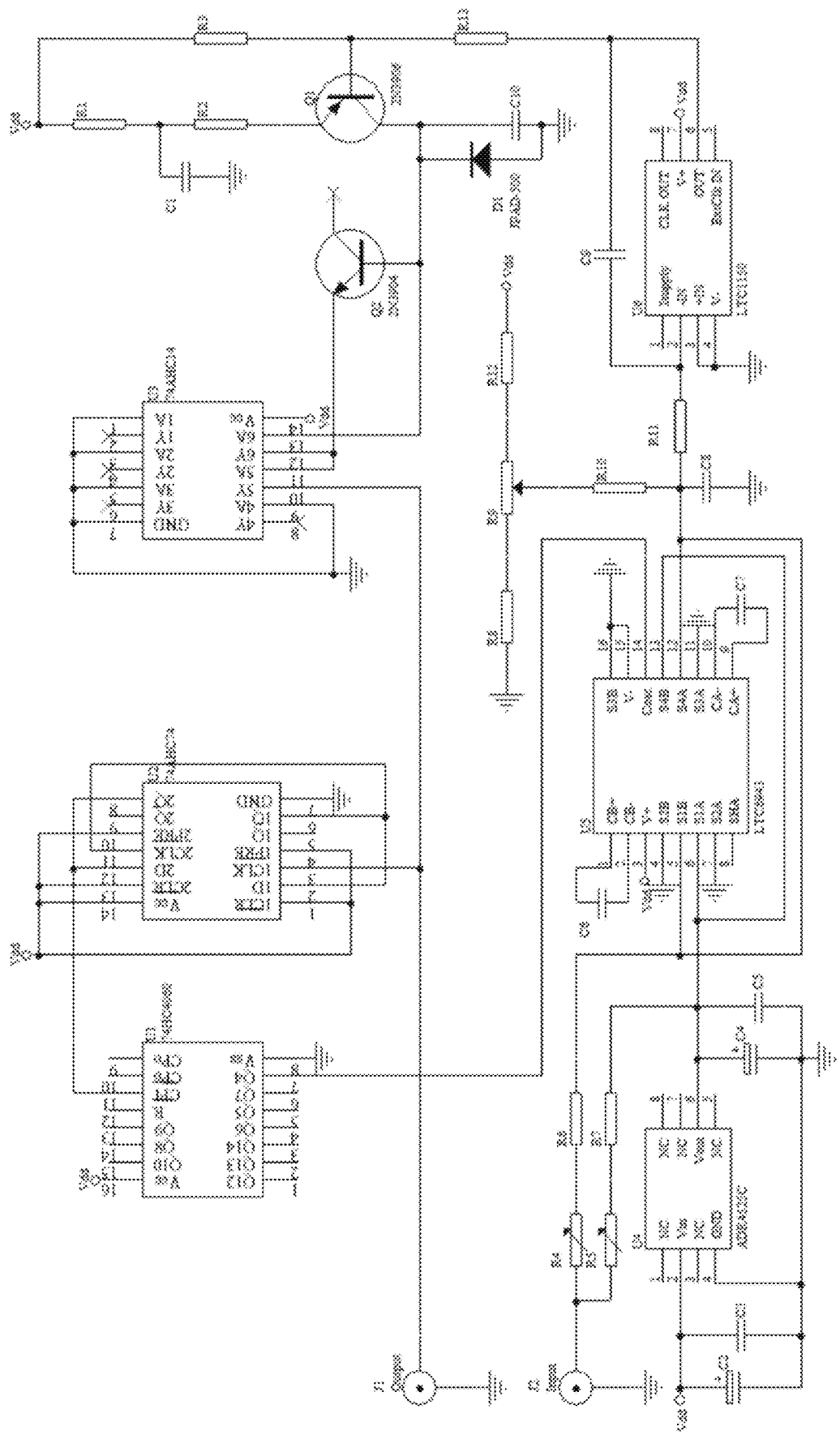
FIG. 7 shows a schematic circuit diagram of a second conversion circuit according to an exemplary embodiment.

As an example, as shown in FIG. 7, the second conversion circuit 13 may comprise a V/F conversion circuit 132 having a dynamic range of 160 dB as a conversion channel for large signals (e.g., having a voltage with an absolute value greater than the threshold voltage). Referring to the circuit shown in FIG. 7, one path of the input signal (which may be a differential signal) is connected to pins 5 and 12 of U5, i.e. LTC6943, via R4 and R6, while the other path of the input signal is connected to pins 6 and 13 of U5, together with pin 6 of U4, i.e. ADR4525C, via R5 and R7. Pin 12 of U5 is connected to pin 2 of U6, i.e. LTC1150, and connected to a center tap of an adjustable resistor R9 via R10. Pin 2 of U6 is connected to pin 6 of U6 via C9. Pin 6 of U6 is connected to a base of a PNP transistor Q1 via R13 and connected to a power supply Vdd via R3. An emitter of Q1 is connected to the power supply Vdd via R2 and R1. A collector of Q1 is connected to a base of an NPN transistor Q2 and pin 14 of U3, i.e. 74AHC14, and grounded after parallel connection of C10 and D1. An emitter of Q2 is connected to pin 11 of U3, and a collector is not connected to other circuits. Pin 11 and pin 12 of U3 are connected, and pin 10 outputs a frequency signal and is connected to pin 3 of U2, i.e. 74AHC74. Pin 2, pin 6, and pin 11 of U2 are connected. Pin 1, pin 4, pin 10, pin 13, and pin 14 are connected to Vdd. Pin 8 and pin 12 are connected to each other and then to pin 11 of U1, i.e. 74HC4060. Pin 7 of U1 is connected to pin 14 of U5.

Optionally, the controller 14 is further configured to calibrate the consistency of one or more specified parameters in the first conversion signal and the second conversion signal. The specified parameters may include at least one of an offset parameter, a linear parameter, and a scale factor.

As an example, the controller 14 is configured to process the two input conversion signals (i.e. the first conversion signal and the second conversion signal). For example, the controller 14 may perform consistency calibration on the difference of parameters such as offset, linearity and scale factor in the two input conversion signals, and fit the two input signals into a final output result (e.g., having or 32 bits or consisting of 32-bit-wide data). Optionally, the controller 14 may comprise one of a plurality of different types of controllers and/or processors, such as a single chip microcomputer, an ARM embedded control processor, and a field programmable gate array (FPGA). When a high-performance FPGA is used, the functions of the frequency counter 133 may be implemented using the on-chip resources of the FPGA, so as to simplify the system circuit.

Optionally, the controller 14 fits the first conversion signal and the second conversion signal using the following equation:

$$Y(n) = \sum_{i=1}^{2} \delta_i Y_i(n), \text{ where } (\delta_1, \delta_2) = \begin{cases} (1, 0), & |x(t)| \leq U_0 \\ (0, 1), & |x(t)| > U_0 \end{cases}$$

where $U_0$ is the voltage threshold, $Y(n)$ is the acquisition result of the seismic data, $|x(t)|$ is the absolute value of the input signal at time t, $Y_1(n)$ is the first conversion signal, and $Y_2(n)$ is the second conversion signal.

Optionally, the specified resolution is 160 dB.

In conclusion, seismic observation is the basis of seismic research, and the signal quality obtained by seismic observation directly affects the effectiveness of seismic monitoring and the level of seismic research. In the high-precision seismic monitoring, a high-sensitivity seismic sensor converts a ground vibration signal into a wide dynamic analog voltage output signal of 160 dB, but the current high-precision seismic data acquisition device cannot meet the requirements of wide dynamic analog-to-digital conversion. Therefore, with the seismic data acquisition device disclosed in this embodiment, a wide dynamic input voltage signal is divided into multiple segments according to the amplitude range. Therefore, the dynamic range of each segment is relatively small, and each segment is synchronously subjected to analog-to-digital conversion by an independent analog-to-digital conversion circuit. After consistency calibration of zero, linearity, sensitivity, and other parameters of each conversion result of concurrent working, the controller obtains a 32-bit digital output with a wide dynamic range by fitting and combining the data. Therefore, the technical solution for seismic data acquisition disclosed in the present application can break through the technical limitation of insufficient dynamic range of the existing ADC and achieve an application target of wide dynamic range acquisition, whereby a set of seismic data acquisition system can achieve high-precision and full-range obtaining of seismic signals, thereby improving the precision of seismic observation, reducing the observation cost, and bringing convenience for the later seismic data processing.

Figure 8:
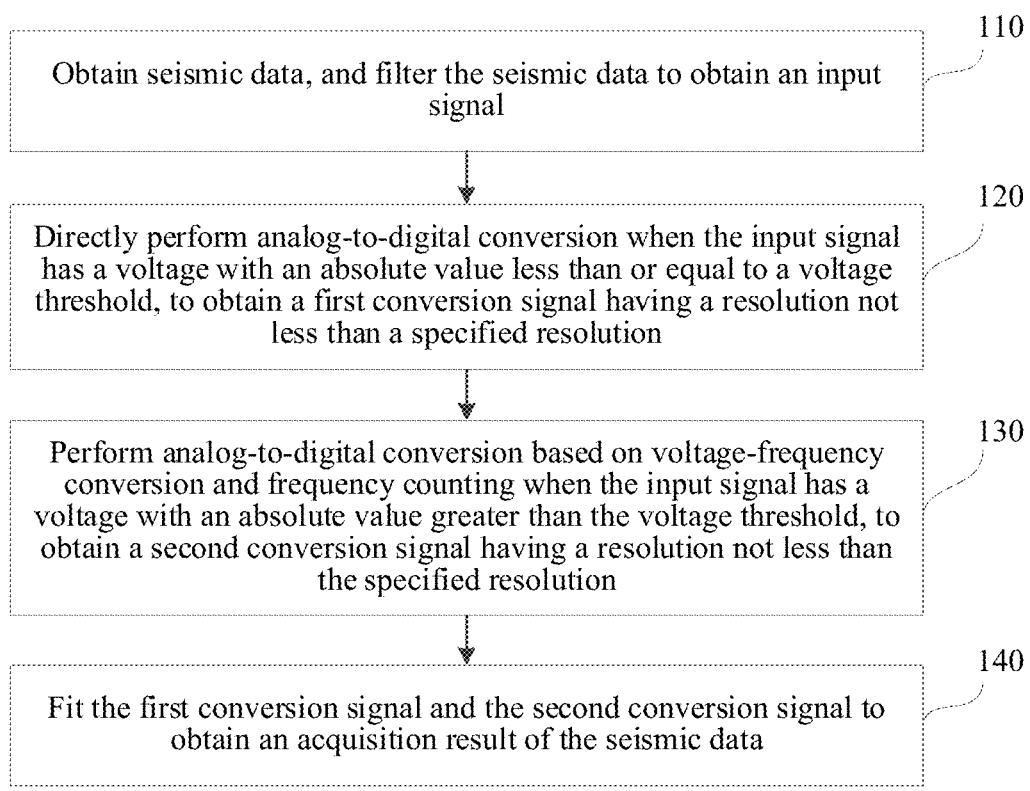
FIG. 8 shows a flowchart of a seismic data acquisition method according to an exemplary embodiment.

FIG. 8 shows a seismic data acquisition method according to an exemplary embodiment. The method may be applied to the above seismic data acquisition device. The method may include the following steps:

At step 110, seismic data is obtained and filtered to obtain an input signal.

At step 120, analog-to-digital conversion is directly performed when the input signal has a voltage with an absolute value less than or equal to a voltage threshold, so as to obtain a first conversion signal having a resolution not less than a specified resolution.

At step 130, analog-to-digital conversion based on voltage-frequency conversion and frequency counting is performed when the input signal has a voltage with an absolute value greater than the voltage threshold, so as to obtain a second conversion signal having a resolution not less than the specified resolution.

At step 140, the first conversion signal and the second conversion signal are fitted to obtain an acquisition result of the seismic data.

The specific implementations of step 110 to step 140 may refer to the working principle of the seismic data acquisition device in the above embodiments, and therefore the description thereof will not be repeated here.

In some implementations, specific implementations of step 140 may include the following operations:

At operation 141, the consistency of specified parameters of the first conversion signal and the second conversion signal is calibrated to obtain a calibrated first conversion signal and a calibrated second conversion signal. The specified parameters include at least one of an offset parameter, a linear parameter, and a scale factor.

At operation 142, the calibrated first conversion signal and the calibrated second conversion signal are fitted into a 32-bit fitting result, and the fitting result is determined as the acquisition result of the seismic data.

The preferred implementations of the present disclosure have been described in detail with reference to the accompanying drawings. However, the present disclosure is not limited to the specific details of the above implementations, various simple modifications may be made to the technical solutions of the present disclosure within the scope of the technical concept of the present disclosure, and these simple modifications fall within the scope of the present disclosure.

It should be further noted that each of the specific technical features described in the above specific implementations may be combined in any suitable manner without prejudice, and that the present disclosure does not describe the possible combinations in order to avoid unnecessary repetition.

In addition, any combination between the various implementations of the present disclosure may also be made without departing from the spirit of the present disclosure, which should also be considered as disclosed in the present disclosure.

What is claimed is:

1. A seismic data acquisition device, comprising:
an anti-aliasing filter having (i) an input configured to receive analog seismic data and (ii) an output,
a first conversion circuit having (i) an input connected to the output of the anti-aliasing filter and (ii) an output,
a second conversion circuit having (i) an input connected to the output of the anti-aliasing filter and (ii) an output, and
a controller having (i) a first input connected to the output of the first conversion circuit and (ii) a second input connected to the output of the second conversion circuit,
wherein:
the anti-aliasing filter is configured to filter the seismic data and output an input signal;
the first conversion circuit is configured to convert the input signal to a first digital conversion signal when the input signal has a first voltage with an absolute value less than or equal to a voltage threshold, wherein the first digital conversion signal has a first resolution not less than a specified resolution;
the second conversion circuit is configured to convert the input signal to a second digital conversion signal based on voltage-frequency conversion and frequency counting when the input signal has a second voltage with an absolute value greater than the voltage threshold, wherein the second digital conversion signal has a second resolution not less than the specified resolution; and
the controller is configured to fit the first conversion signal and the second conversion signal and output an acquisition result of the seismic data.

2. The seismic data acquisition device according to claim 1, wherein
the first conversion circuit comprises a level matching resistor network, a first buffer having an input and an output, a pre-amplifier having an input and an output, a clock circuit, a fourth-order modulator having a first input, a second input, a third input and an output, a second buffer having an input and an output, a digital filter having a first input, a second input and an output, and a digital interface having a first input, a second input and an output;
the level matching resistor network has (i) an input connected to the output of the anti-aliasing filter and (ii) an output connected to the input of the first buffer,
the output of the first buffer is connected to the input of the pre-amplifier;
the first input of the fourth-order modulator is connected to the output of the pre-amplifier;
the second input of the fourth-order modulator is connected to the output of the second buffer,
the input of the second buffer is configured to receive a reference voltage signal;
the third input of the fourth-order modulator is connected to the clock circuit;
the output of the fourth-order modulator is connected to the second input of the digital filter;
the output of the digital filter is connected to the second input of the digital interface, and
the output of the digital interface is connected to the first input of the controller.

3. The seismic data acquisition device according to claim 1, wherein the second conversion circuit comprises a level shifter having an input and an output, a voltage-frequency conversion circuit and a frequency counter having an output, the input of the level shifter is connected to the output of the anti-aliasing filter, and the output end of the frequency counter is connected to the second input of the controller.

4. The seismic data acquisition device according to claim 3, wherein the level shifter is connected to the voltage-frequency conversion circuit, and the voltage-frequency conversion circuit is connected to the frequency counter.

5. The seismic data acquisition device according to claim 3, wherein the voltage-frequency conversion circuit has a dynamic range of 160 dB or above.

6. The seismic data acquisition device according to claim 3, wherein the voltage-frequency conversion circuit comprises a signal input circuit having an input and an output, an adder having a first input, a second input, a third input and an output, a compensation current circuit, a charge pump having a first input, a second input and an output, a reference voltage source having an input and an output, an integrator having an input and an output, a voltage controlled oscillator having an input and an output, a third buffer having an input and an output, a frequency divider having an input and an output, and a charge pump clock having an input and an output;
   the input of the signal input circuit is connected to the output of the level shifter,
   the output of the signal input circuit is connected to the first input of the adder;
   the second input of the adder is connected to the compensation current circuit,
   the third input of the adder is connected to the output of the charge pump,
   the output of the adder is connected to the input of the integrator;
   the input of the voltage controlled oscillator is connected to the output of the integrator,
   the output of the voltage controlled oscillator is connected to the input of the third buffer;
   the output of the third buffer is connected to the input of the frequency counter and the input end of the frequency divider;
   the input of the charge pump clock is connected to the output of the frequency divider,
   the output of the charge pump clock is connected to the first input of the charge pump;
   the second input of the charge pump is connected to the reference voltage source.

7. The seismic data acquisition device according to claim 1, wherein the controller is further configured to calibrate a consistency of one or more specified parameters in the first conversion signal and the second conversion signal.

8. The seismic data acquisition device according to claim 7, wherein the one or more specified parameters comprise at least one of an offset parameter, a linear parameter, and a scale factor.

9. The seismic data acquisition device according to claim 1, wherein the controller fits the first conversion signal and the second conversion signal using the following equation:

$$Y(n) = \sum_{i=1}^{2} \delta_i Y_i(n), \text{ where } (\delta_1, \delta_2) = \begin{cases} (1, 0), & |x(t)| \leq U_0 \\ (0, 1), & |x(t)| > U_0 \end{cases}$$

wherein $U_0$ is the voltage threshold, $Y(n)$ is the acquisition result of the seismic data, $|x(t)|$ is the absolute value of the input signal at time t, $Y_1(n)$ is the first conversion signal, and $Y_2(n)$ is the second conversion signal.

10. The seismic data acquisition device according to claim 1, wherein the specified resolution is 160 dB.

11. A seismic data acquisition method, comprising:
obtaining seismic data;
filtering the seismic data to obtain an analog input signal;
converting the input signal to a first digital signal when the input signal has a voltage with an absolute value less than or equal to a voltage threshold, to obtain a first conversion signal having a resolution not less than a specified resolution;
converting the input signal to a second digital signal based on a voltage conversion frequency and a frequency counting mode when the input signal has the voltage with the absolute voltage value greater than the voltage threshold, to obtain a second conversion signal having the resolution not less than the specified resolution; and
fitting the first conversion signal and the second conversion signal to obtain an acquisition result of the seismic data.

12. The seismic data acquisition method according to claim 11, wherein fitting the first conversion signal and the second conversion signal comprises:
calibrating a consistency of one or more specified parameters of the first conversion signal and the second conversion signal to obtain a calibrated first conversion signal and a calibrated second conversion signal;
fitting the calibrated first conversion signal and the calibrated second conversion signal into a 32-bit fitting result, and
determining the fitting result as the acquisition result of the seismic data.

13. The seismic data acquisition method according to claim 12, wherein the one or more specified parameters comprise at least one of an offset parameter, a linear parameter, and a scale factor.

* * * * *